Figure 1:
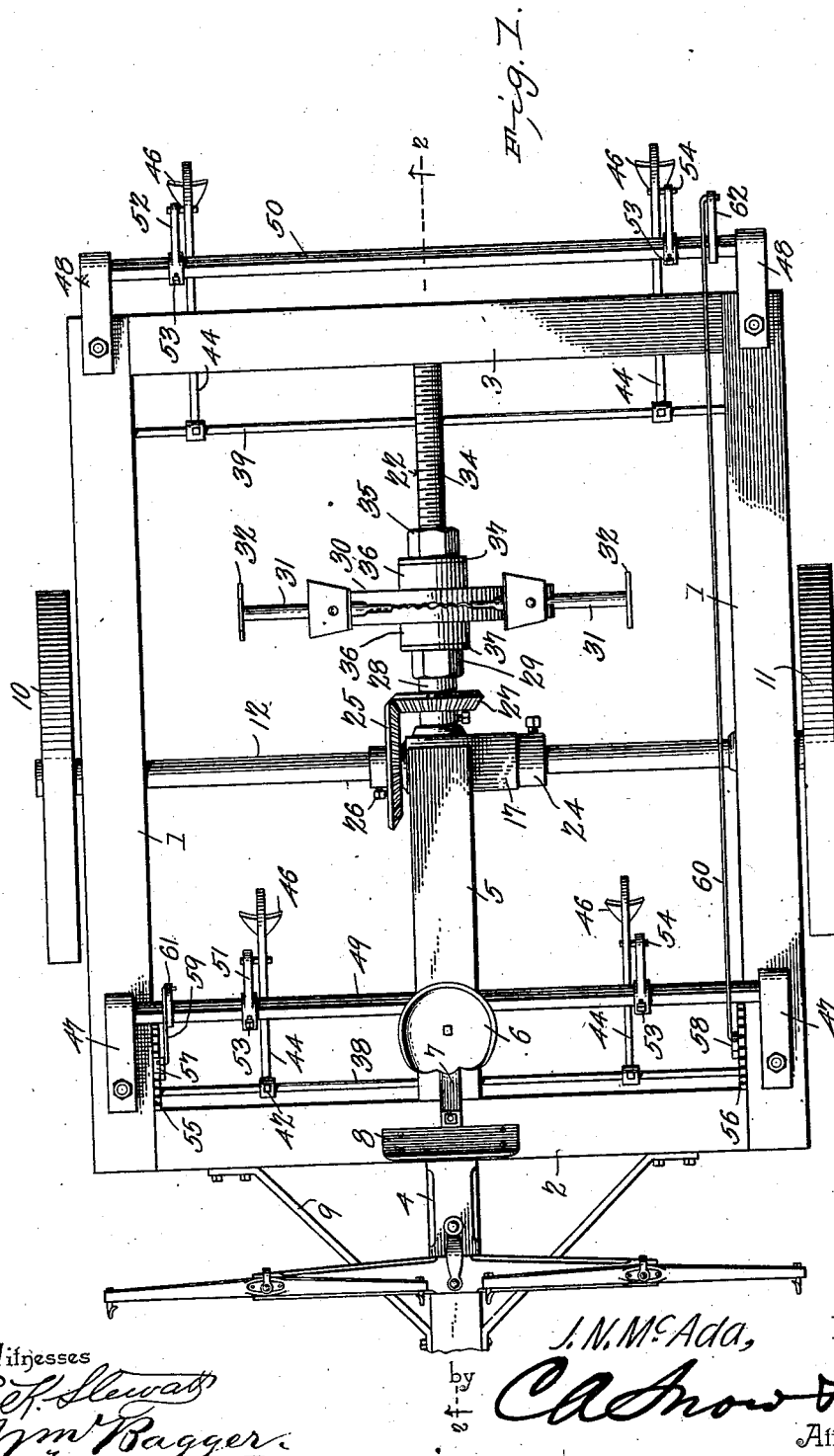

No. 723,542. PATENTED MAR. 24, 1903.
J. N. McADA.
COTTON CHOPPER AND CULTIVATOR.
APPLICATION FILED OCT. 28, 1902.
NO MODEL. 2 SHEETS—SHEET 1.

Witnesses
Inventor: J. N. McAda,
by C. A. Snow & Co.
Attorneys

No. 723,542. PATENTED MAR. 24, 1903.
J. N. McADA.
COTTON CHOPPER AND CULTIVATOR.
APPLICATION FILED OCT. 28, 1902.
NO MODEL. 2 SHEETS—SHEET 2.
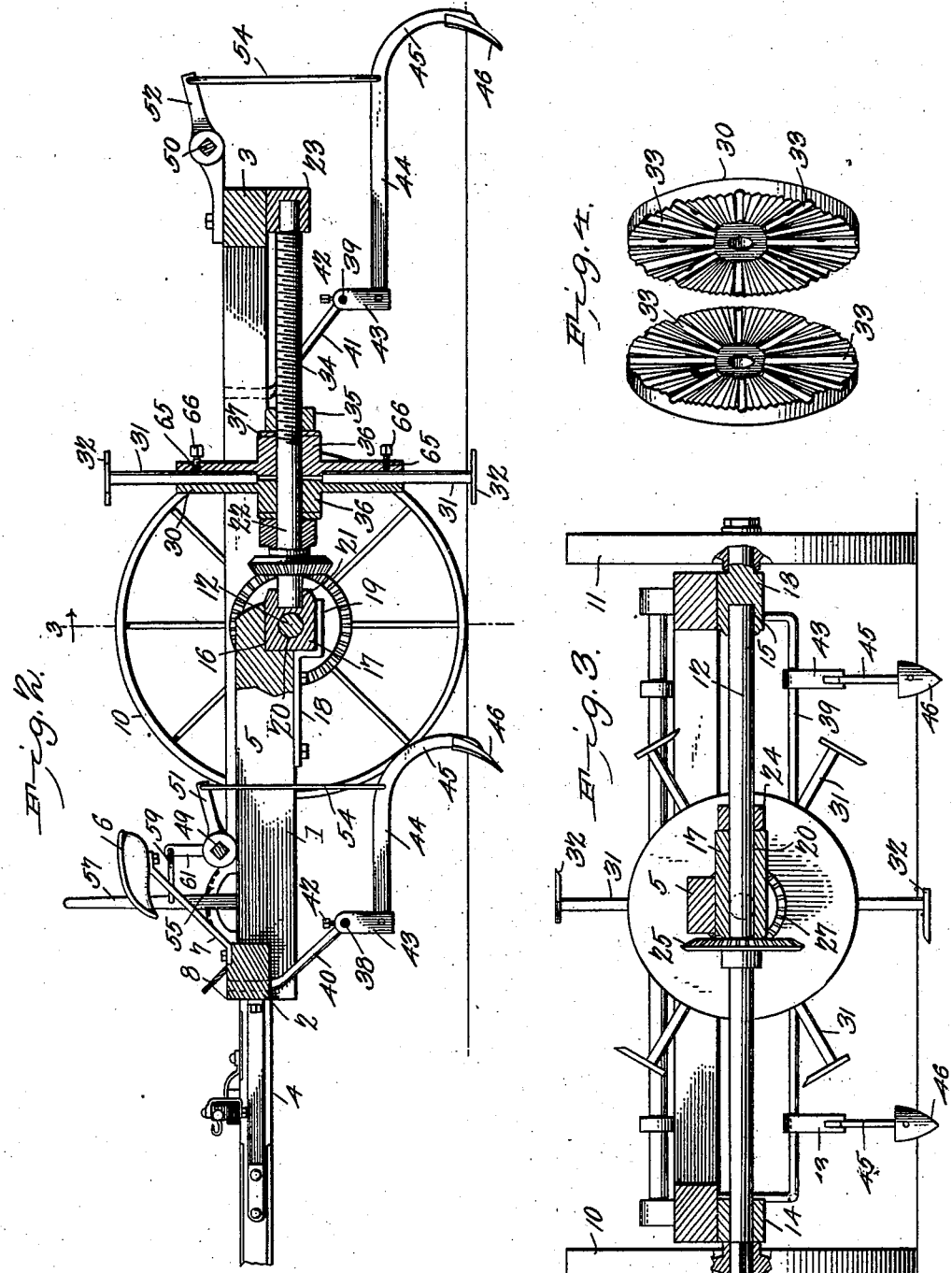

UNITED STATES PATENT OFFICE.

JAMES NEWTON McADA, OF CAMPBELLTON, TEXAS.

COTTON CHOPPER AND CULTIVATOR.

SPECIFICATION forming part of Letters Patent No. 723,542, dated March 24, 1903.

Application filed October 28, 1902. Serial No. 129,165. (No model.)

*To all whom it may concern:*

Be it known that I, JAMES NEWTON MCADA, a citizen of the United States, residing at Campbellton, in the county of Atascosa and State of Texas, have invented a new and useful Cotton Chopper and Cultivator, of which the following is a specification.

This invention relates to cotton choppers and cultivators; and it has for its object to provide a device of this class which shall possess superior advantages in point of simplicity, durablility, and general efficiency, in which the cultivator-blades may be readily adjusted to any desired distance from the row of plants that is being operated upon, and in which the number of chopping-hoes may be increased or diminished, so as to regulate the distance between the stands of cotton or the extent of each stand.

With these and other ends in view the invention consists in the improved construction, arrangement, and combination of parts, which will be hereinafter fully described, and particularly pointed out in the claims.

In the accompanying drawings, Figure 1 is a plan view of a combination cotton chopper and cultivator constructed in accordance with the principles of my invention. Fig. 2 is a longitudinal sectional view of the same, taken on the vertical plane indicated by the line 2 2 in Fig. 1. Fig. 3 is a transverse sectional view taken on the line 3 3 in Fig. 2. Fig. 4 is a perspective detail view showing the washer plates or burs between which the shanks of the hoes are clamped in position for operation.

Corresponding parts in the several figures are indicated by similar numerals of reference.

The frame of my improved implement is preferably rectangular in shape and is composed of the side beams 11, the front beam 2, and rear beam 3, which are suitably connected at the corners. A tongue 4, connected with the front beam, has a rearward extension 5, forming a bracket, which extends nearly to the center of the frame. A seat 6 for the driver is mounted upon a standard 7, which is secured near the front of the frame, and a foot-board 8 may also be provided. Hounds 9 connect the front frame-beam with the tongue, which is thereby strengthened and supported, and the tongue supports a draft attachment consisting of the ordinary doubletree.

The wheels 10 and 11, upon which the frame is supported, are mounted, respectively, upon an axle 12 and a stub 13, which latter is suitably secured to the under side of one of the frame-beams 1 in alinement with the box 14, secured under the opposite frame-beam, which affords one of the bearings for the axle 12. The other bearing of the latter is formed, as shown at 15, in the inner end of the stub 13. The supporting-wheel 11, as will be seen, revolves loosely upon the stub, while the supporting-wheel 10 is mounted securely upon the axle, which will thus be caused to revolve in its bearings.

The rear end of the tongue extension or bracket 5 is provided with a recess 16 in its under side, in which is mounted a box 17, supported by means of a bracket 18, which latter is secured to the under side of the bracket 5 and provided with a step 19, fitted to the under side of the box. The latter is longitudinally bored, as at 20, to form an additional bearing for the axle 12, and it has a transverse bore 21, forming a bearing for a shaft 22, which is disposed longitudinally to the frame and the rear end of which is journaled in a box or bracket 23, depending from the rear beam 3 of the frame. The box 17 is kept from lateral movement upon the axle by means of a set-collar 24 at one end thereof and a bevel-gear 25 at its other end, said bevel-gear being secured by means of a setscrew 26 extending through the hub thereof, the bevel-gear 25 meshing with a pinion 27 upon the shaft 22, to which latter a rotary motion is thus imparted from the axle of the machine.

The hub 28 of the pinion 27, which is secured upon the shaft 22 by a set-screw or in any other suitable manner, is extended so as to form a collar 29, against which abuts one of the washer - plates 30, between which the shanks 31 of the hoes 32 are clamped. Said washer-plates are radially serrated upon their inner adjacent faces, where they are also provided with a plurality of grooves 33, adapted to receive the hoe-shanks. The parts should be so proportioned that when the hoe-shanks are inserted into the grooves provided for their reception the serrations of the two disks or washers shall still intermesh with each other, so as to prevent axial displacement of either disk. The rear end of the shaft 22 has a screw-threaded portion 34, upon which is mounted a lock-nut 35, by tightening which against the rear disk 30 the said disks may be clamped tightly together, the front disk abutting upon the collar 29 of the pinion 27. The disks 30 may be provided with hub portions 36, as shown in the drawings; but this is not necessary or essential. It is obvious that washers may be suitably disposed, when desired, as shown at 37, in order to adjust the disks 30 in the desired location upon the shaft 22. It will be seen that by this construction and arrangement of parts the hoes may not only be adjusted radially with relation to the shaft 22, so as to engage the soil and chop out the plants at any desired depth, but also that by providing the disks with a suitable number of grooves 33 various numbers of hoes may be employed, thereby regulating the distance between the stands and the extent of the latter. In the drawings I have shown twelve such grooves, thus enabling me to use any number of hoes forming a divisor of twelve.

38 and 39 represent shafts having upwardly and forwardly extending arms 40 and 41, by means of which they are secured to or connected with the under side of the frame at the front and near the rear end of the latter, respectively. Mounted and laterally adjustable upon said shafts by means of set-screws 42 are clips 43, the lower ends of which are bifurcated for the reception of the cultivator-beams 44, the rear ends of which are curved to form the standards 45, carrying blades or shovels 46 of any desired pattern. The upper side of the frame is provided at its front and rear ends with brackets 47 and 48, forming bearings for rock-shafts 49 and 50, which, as will be seen, are polygonal in cross-section, and upon which arms 51 and 52 are so mounted, by means of set-screws 53 or other suitable fastening means, in such a manner as to be laterally adjustable upon the said rock-shafts. The arms 51 and 52 are connected by means of link-rods 54, respectively, with the front and rear cultivator-beams. Upon the sides of the frame, at the front end of the latter, are mounted two segment-racks 55 and 56, and concentrically with each of said racks is mounted a lever 57 58, said levers being each provided with suitably-operated dogs or pawls to engage their respective racks, and thus to retain the levers in any position to which they may be adjusted. The levers 57 and 58 are connected by means of links 59 and 60 with arms 61 and 62, extending from the rock-shafts 49 and 50, respectively. It will be seen that by means of these levers the cultivators may be raised or lowered, so as to cause them to enter the soil to any desired depth or to elevate them above the ground for carrying purposes. It will be further seen that by properly adjusting the arms 51 and 52 and the clips 43 upon their respective shafts the cultivators may be set at any desired distance from the longitudinal center of the machine, thereby causing them to work at any desired distance from the row of plants that is being operated upon, as will be readily understood.

In the accompanying drawings I have shown the rear clamping-disk 30 provided with a plurality of screw-threaded perforations 65, disposed in alinement with the grooves 33 for the reception of set-screws 66, engaging the shanks 31, carrying the hoe-blades 32. These set-screws will not only serve to effectually prevent radial displacement of the said hoeing implements, but also to some extent to force the clamping-disks apart against the tension of the clamping-nut 25, which is thereby securely locked, so as to prevent any possibility of displacement of the members of the chopping device when the machine is in operation.

From the foregoing description, taken in connection with the drawings hereto annexed, the operation and advantages of my invention will be readily understood. The general construction is exceedingly simple and inexpensive and of such a nature that the machine may be easily dismembered and reassembled as occasion may require. It will be especially noticed that when desired the shaft carrying the cotton-chopping device may be readily removed, thus enabling the machine to be used as a cultivator only.

I desire it to be understood that while I have described the preferred form of my invention I do not necessarily limit myself to the detailed construction herein set forth, but reserve the right to any changes and modifications which may be resorted to without departing from the spirit and scope of my invention or sacrificing the utility of the same.

Having thus described my invention, what I claim is—

1. In a machine of the class described, a frame having a rearward tongue extension forming a bracket recessed at its rear end, a stub under one side of said frame, carrying a loose wheel and having a bearing in the inner end thereof, a box secured under the other side of said frame, an axle journaled in said box and in the bearing at the inner end of the stub and having a fixed wheel, an additional bearing for said axle mounted in the recess at the rear end of the tongue extension, a bracket upon the under side of the latter supporting said bearing, a longitudinally-disposed shaft, bearings for said shaft formed in the auxiliary axle-bearing and in a box upon the under side of the frame at the rear end of the latter, means for transmitting motion to said shaft from the axle and chopping means mounted upon said shaft.

2. In a machine of the class described, a frame, a revoluble axle having a fixed wheel, bearings for said axle upon the under side of said frame, one of said bearings being in a stub carrying a loose wheel, an auxiliary bearing for said axle connected with a rearward extension of the tongue and having a bearing formed in the rear side thereof, a longitudinal shaft having a screw-threaded portion, the front end of said shaft being journaled in the bearing in the rear side of the auxiliary axle-bearing, a bearing for the rear end of said shaft depending from the rear end of the frame, a bevel-gear mounted upon the axle, a pinion mounted upon the longitudinal shaft and meshing with the said bevel-gear, and cotton-chopping means mounted upon said shaft.

3. In a machine of the class described, a revoluble shaft having a screw-threaded portion, a pinion mounted upon said shaft to receive motion from the source of power, a pair of clamping-disks movably mounted upon said shaft and having serrated meeting faces and radial grooves therein, set-screws in one of said disks alining with said grooves, chopping elements having shanks adapted to engage said grooves and a nut upon the screw-threaded portion of the shaft adapted to tighten the clamping-disks together against the hub of the pinion.

4. In a combined cotton chopper and cultivator, a frame, a longitudinally-disposed shaft carrying the chopping elements, a revoluble axle having a fixed wheel, means for transmitting motion from said axle to the chopper-shaft, transverse shafts having arms or brackets connected with the frame, clips laterally adjustable upon said shafts, cultivators pivotally connected with said clips, rock-shafts mounted upon the frame, arms laterally adjustable on said rock-shafts, link-rods connecting said arms with the cultivator-beams, and means for operating and adjusting said rock-shafts to raise and lower the cultivators.

In testimony that I claim the foregoing as my own I have hereto affixed my signature in the presence of two witnesses.

JAMES NEWTON McADA.

Witnesses:
R. B. ALLEN,
JAURDAN CAMPBELL.